United States Patent
Mahmoud et al.

(10) Patent No.: US 10,062,101 B2
(45) Date of Patent: Aug. 28, 2018

(54) MAXIMIZING THE PROPENSITY OF CONTENT CONSUMPTION ACCORDING TO CONTENT COMPLEXITY AND CONTENT CONSUMPTION TIME

(71) Applicant: LinkedIn Corporation, Mountain View, CA (US)

(72) Inventors: Mohamed Gamal Mohamed Mahmoud, Santa Clara, CA (US); Sofia Andrianakou, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 15/228,880

(22) Filed: Aug. 4, 2016

(65) Prior Publication Data
US 2018/0040056 A1 Feb. 8, 2018

(51) Int. Cl.
*G06Q 30/00* (2012.01)
*G06Q 30/06* (2012.01)
*H04L 29/08* (2006.01)
*G06N 5/02* (2006.01)

(52) U.S. Cl.
CPC ........... *G06Q 30/0633* (2013.01); *G06N 5/02* (2013.01); *H04L 67/306* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

2009/0306959 A1* 12/2009 Rappoport ............... G09B 7/02
  704/2
2015/0332314 A1* 11/2015 Chakraborty .......... G06Q 50/01
  705/14.45
2016/0227291 A1* 8/2016 Shaw .................... H04N 21/251

OTHER PUBLICATIONS

Washington, B.F., "Analysis: Facebook Users are Rebelling Against Clickbait" (Daily Herald, Jul. 3, 2016) https://dialog.proquest.com/professional/docview/1801762118?accountid=142257 (Year: 2016).*

* cited by examiner

*Primary Examiner* — Ethan D Civan
(74) *Attorney, Agent, or Firm* — Park, Vaughan, Fleming & Dowler LLP (57) ABSTRACT

The disclosed embodiments provide a system for maximizing the propensity of content consumption according to content complexity and content consumption time. During operation, the system receives a request from a user to access a content feed. Based on a time of receipt, the system identifies a current seasonality that corresponds to reading habits of the user during a time period encompassing the time of receipt. The system then accesses a profile for the user to obtain a reading speed of the user and the reading habits of the user for the current seasonality. Next, the system: identifies a subset of content items; estimates a reading session length; and determines a complexity, with regard to the user, for each content item. The system then creates the content feed by ordering the subset of content items according to the reading session length and the complexity of each content item.

20 Claims, 8 Drawing Sheets

MAXIMIZING THE PROPENSITY OF CONTENT CONSUMPTION ACCORDING TO CONTENT COMPLEXITY AND CONTENT CONSUMPTION TIME

BACKGROUND

Field

The disclosed embodiments relate to the selection of content in a content system. More specifically, the disclosed embodiments relate to techniques for maximizing the propensity of content consumption according to content complexity and content consumption time.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, posts, status updates, likes, comments, shares, and/or other types of content or social network interaction for each user accessing the social network. The user may then click on a posting of the content item within the news feed to navigate to a website on which the content item is hosted and access the entirety of the content item.

While content feeds provide information to users in a central location that adds value and generally improves the user experience, the selection and ordering of content items in the content feed can dramatically alter the user experience. For example, if a user is presented with a set of complex articles that are long, and the user is accessing the content feed from a mobile phone during a work break, then the user might quickly realize that they do not have the time to read the articles, and disengage from the content feed. On the contrary, if a user sits down on Saturday morning at a desktop computer to access the content feed, and the content feed is full of short simple stories, then the user may quickly become disinterested in the content.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for selecting content in a content system. More specifically, the disclosed embodiments provide a method, apparatus, and system for maximizing the propensity of content consumption according to content complexity and content consumption time.

Figure 1:
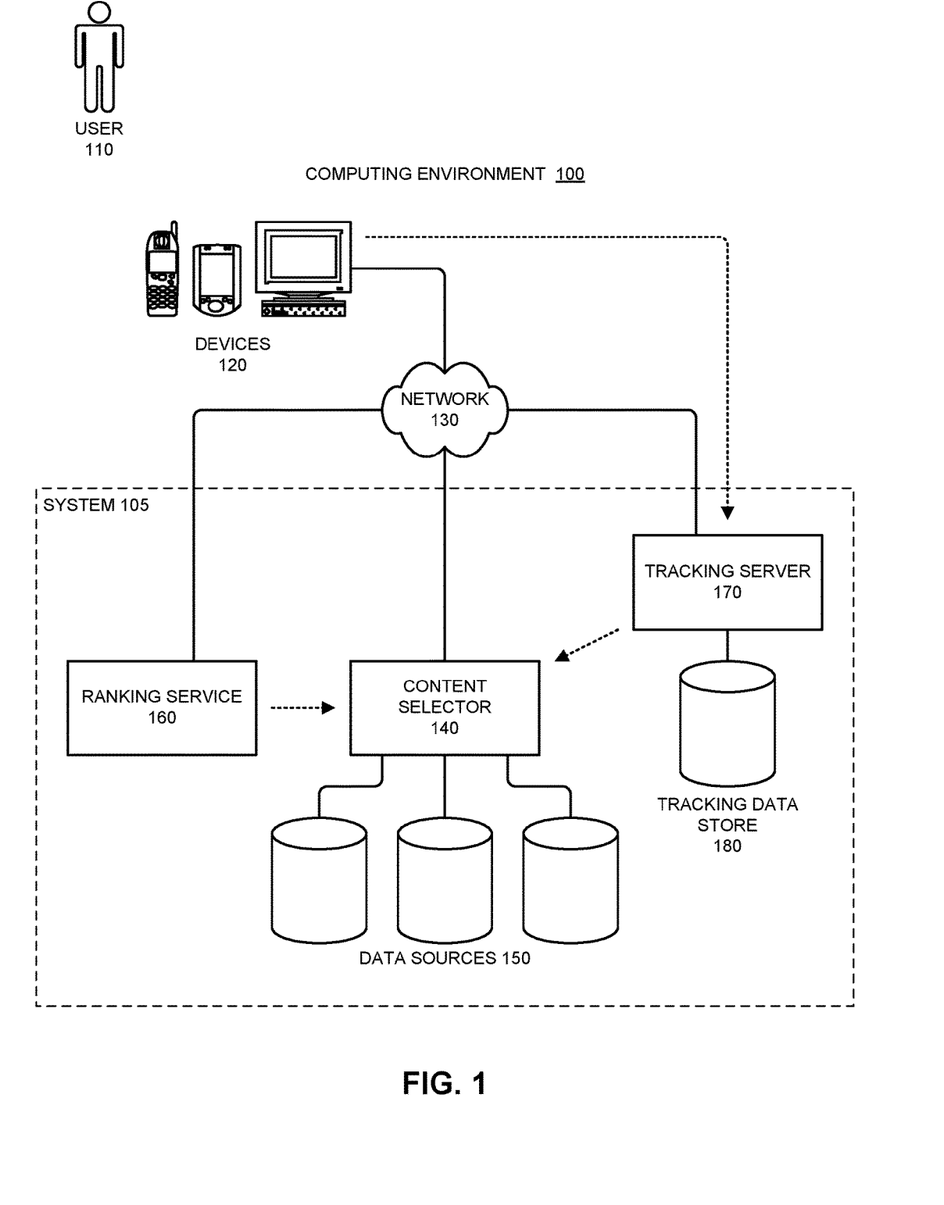
FIG. 1 shows a system for maximizing the propensity of content consumption according to content complexity and content consumption time in accordance with the disclosed embodiments.

FIG. 1 shows a system for maximizing the propensity of content consumption according to content complexity and content consumption time in accordance with the disclosed embodiments. FIG. 1 comprises computing environment 100. Note that computing environment 100 is shown for illustrative purposes only. While a specific embodiment is shown for computing environment 100, embodiments of the present invention are not meant to be limited to the computing environment shown as computing environment 100.

Computing environment 100 comprises devices 120, network 130, and system 105, which includes content selector 140, data sources 150, ranking service 160, tracking server 170, and tracking data store 180. User 110 interacts with devices 120. Devices 120 can generally include any item capable of connecting to network 130 and displaying content to user 110. This may include, but is not limited to, smart phones, tablets, notebooks, computers, servers, appliances, smart watches, and e-readers.

Network 130 can generally include any type of wired or wireless communication channel capable of coupling together computing nodes. This includes, but is not limited to, a local area network, a wide area network, a virtual private network, or a combination of networks. In one embodiment of the present invention, network 130 includes the Internet.

Content selector 140, ranking service 160 and tracking server 170 are also coupled to network 130. Content selector 140, ranking service 160 and tracking server 170 can generally include any nodes on a computer network, including a mechanism for servicing requests from a client for computational and/or data storage resources. The operation of content selector 140, ranking service 160 and tracking server 170 is described in more detail below.

Content selector 140 is additionally coupled to data sources 150, while tracking server 170 is additionally coupled to tracking data store 180. Data sources 150 and tracking data store 180 can include any type of system for storing data in non-volatile storage. This includes, but is not limited to, systems based upon magnetic, optical, or magneto-optical storage devices, as well as storage devices based on flash memory and/or battery-backed up memory.

A wide variety of services may be provided using system 105. In the discussion that follows, a social network (and, more generally, a user community), such as an online professional network, which facilitates interactions among the users, is used as an illustrative example.

Note that each of the users of the social network may have an associated user profile that includes personal and professional characteristics and experiences, which are sometimes collectively referred to as 'attributes' or 'characteristics.' For example, a user profile may include: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, average amount of time users spends on the site, search topics, browsing certain web pages, locations (such as IP addresses) associated with the users, advertising or recommendations presented to the users, user responses to the advertising or recommendations, likes or shares exchanged by the users, interest segments for the likes or shares, bounce rate for the users indicating their engagement with the site, a history of user activities when using the social network, and/or propensity for users to stay on the site and perform actions, such as reading content. If a user, on average, spends one minute on the social network, they are not likely to consume long form pieces of content, so the system adjusts the length of content displayed accordingly. Furthermore, when building the user profile, it may be beneficial for the system to look at types of content that the user has typically consumed on the site, both in terms of content type and content length.

Additionally, the system extrapolates user profiles for users for which the system does not have enough information. The system captures all the different signals about the user in order to predict the user's propensity to read content. When all of the signals are not available, the system extrapolates the inputs based on the user's profile/persona. As the system analyzes more users, the system can create profiles/personas and apply them to users for whom the system does not have a plethora of inputs. For instance, if John is a Software engineer in Tech (and has XYZ other attributes) and is a new user (so the system does not have a lot of data on John), the system can assume he is similar to Mitchell, who is also a Software Engineer in Tech (with similar XYZ other attributes).

As mentioned previously, the system also determines the propensity for a particular user to read a particular item of content. For every user and every piece of content, the system determines a confidence or likelihood of consumption. The system determines a correlation for every user (based on the user's attributes) against every piece of content. The user/content combination that has the highest correlation or propensity for consumption, is the content that is delivered to the user.

Figure 2A:
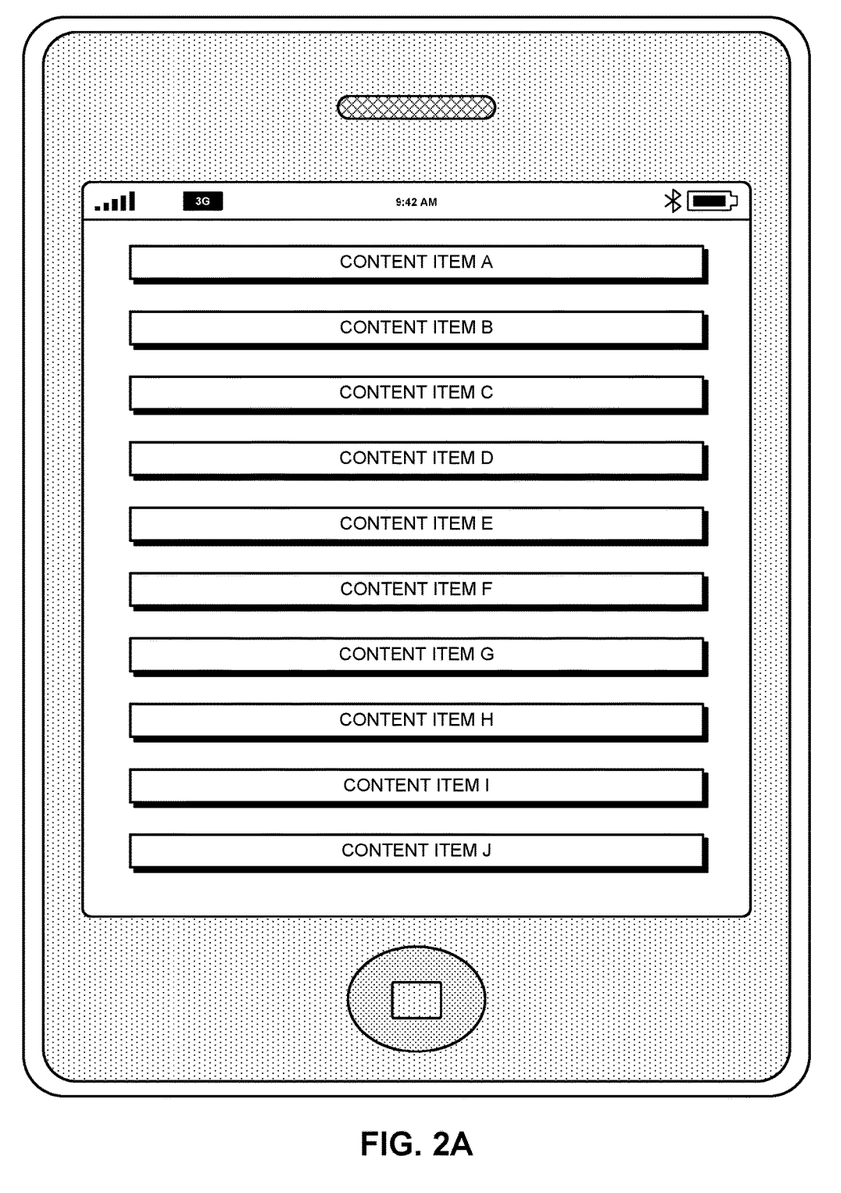
FIG. 2A shows a ranking of content during a first seasonality in accordance with the disclosed embodiments.

FIG. 2A shows a ranking of content during a first seasonality in accordance with the disclosed embodiments. As illustrated in FIG. 2A, device 120 displays a content feed comprising content items A through J to user 110. The size of the content items A through J in FIG. 2A represent the length of content items A through J, and not necessarily the amount of screen area that content items A through J would occupy on device 120. It may be noted that the content items are relatively short or small.

In some embodiments, seasonality is generally defined as a period of time wherein a user exhibits consistent behavior with regard to reading habits. Note that a given seasonality is entirely based on a specific user's reading habits and is tied to a specific device. Seasonalities can range from very short periods of time, lasting only minutes, to very long periods of time, lasting days or longer. For example, a seasonality for user 110, as illustrated in FIG. 2A, might comprise weekday mornings from 9:30-9:45 AM. This seasonality might be based on a recognized pattern over multiple days, wherein user 110 reads short content items that are low in complexity on a mobile phone during this time period, and might correspond to morning work break.

Figure 2B:
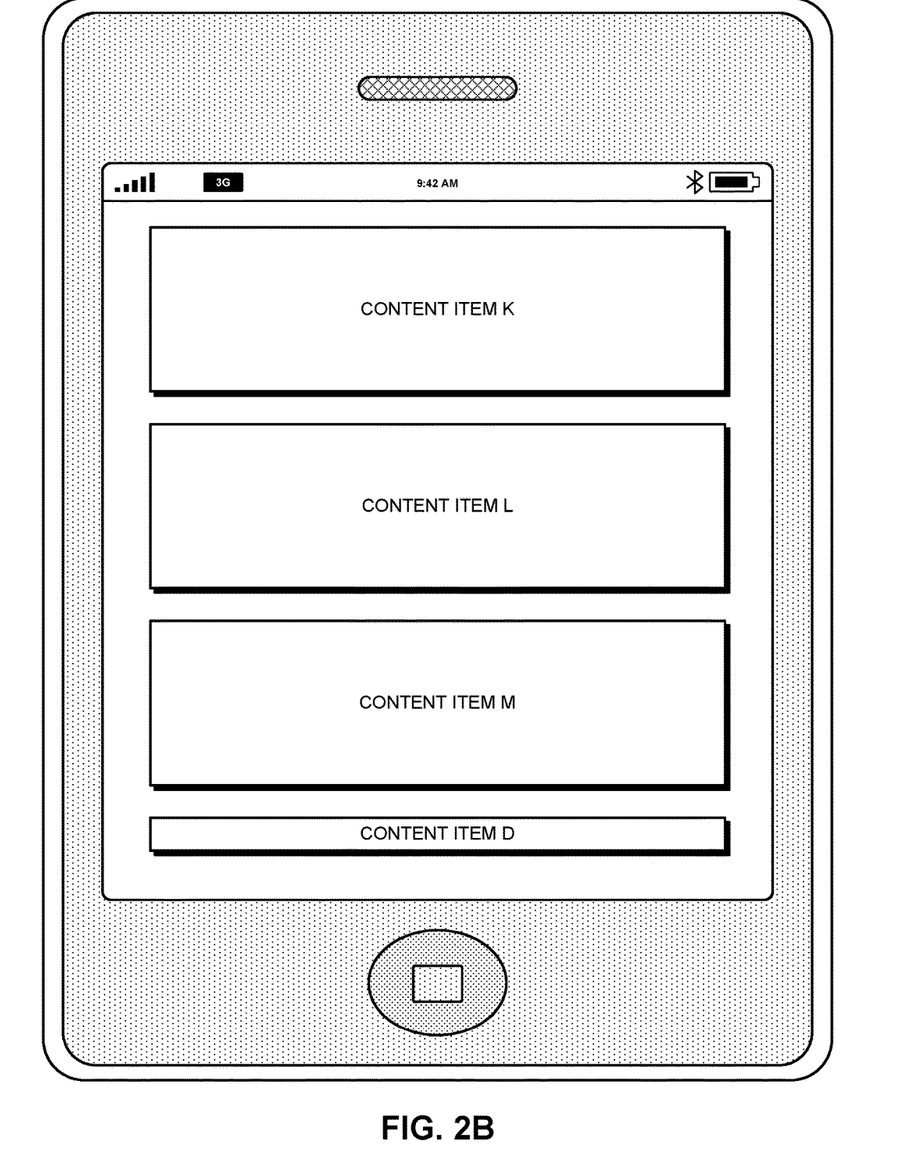
FIG. 2B shows a ranking of content during a second seasonality in accordance with the disclosed embodiments.

FIG. 2B shows a ranking of content during a second seasonality in accordance with the disclosed embodiments. As illustrated in FIG. 2B, device 120 displays a content feed comprising content items K through M and content item D to user 110. Note that content items K through M are considerably longer than content item D. Content items with the same letters from FIG. 2A and FIG. 2B represent the same content items. This seasonality might be based on a recognized pattern wherein user 110 reads longer content items that are higher in complexity, and accesses the content feed on a tablet. This seasonality could, for example, correspond to Saturday mornings before noon, which is a time when user 110 relaxes with the tablet and catches up on longer technical articles. Note that while the seasonality influences what is displayed to user 110 in the content feed, a given content item may be presented to user 110 during multiple different seasonalities, based on ranking scores for the content items and/or other factors. For example, based on ranking scores, content item D is presented to user 110 in both the first and the second seasonality.

Figure 3:
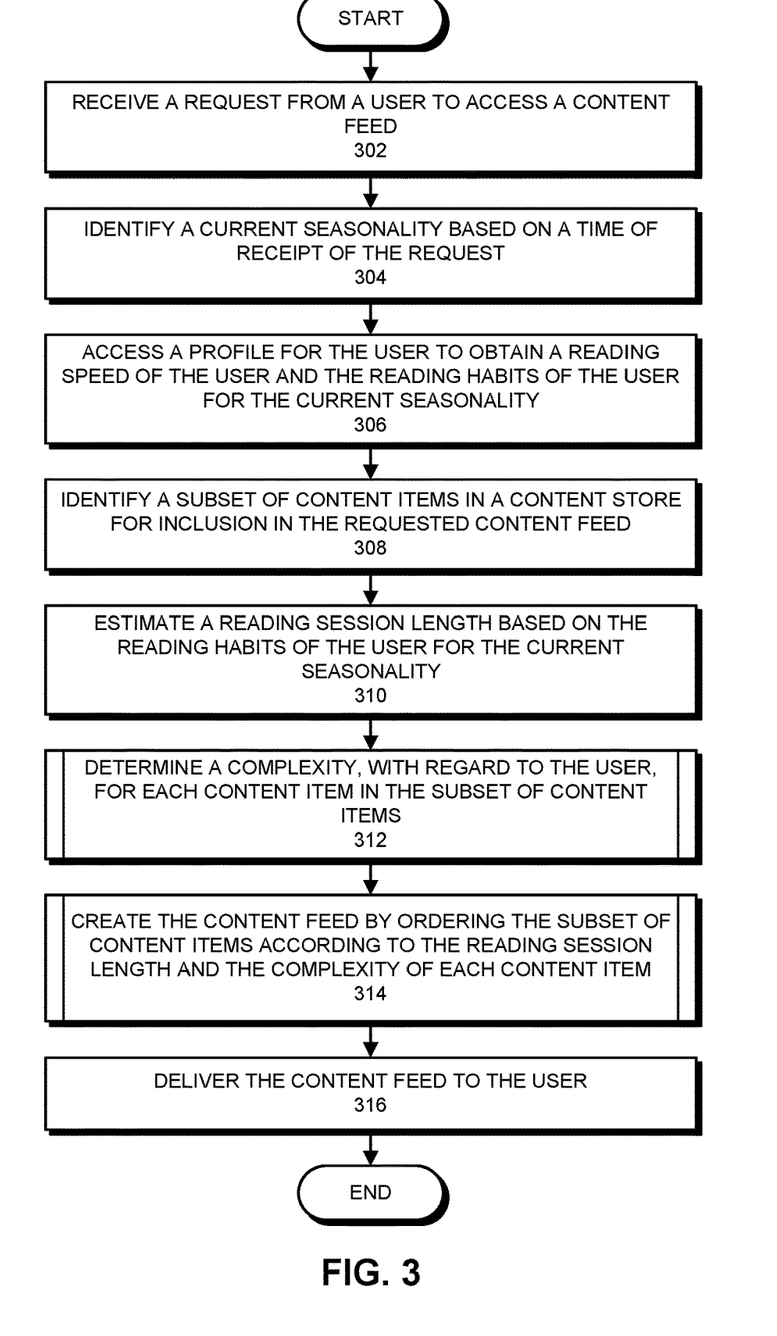
FIG. 3 shows a flowchart illustrating a process of maximizing the propensity of content consumption according to content complexity and content consumption time in accordance with the disclosed embodiments.

FIG. 3 shows a flowchart illustrating a process of maximizing the propensity of content consumption according to content complexity and content consumption time in accordance with the disclosed embodiments.

During operation, the system receives a request from user 110 to access a content feed (operation 302). Illustratively, this may involve the user logging into a professional network or other online application or service that provides feeds to users. In response to this request, the system identifies a current seasonality based on a time of receipt of the request (operation 304). In the illustrated process, the current seasonality corresponds to reading habits of user 110 during a time period encompassing the time of receipt. If the request is received around 09:40 AM on a Monday morning, the system might identify the current seasonality as corresponding to 09:40 AM on Monday mornings. Note that the seasonality may encompass a very small time window that occurs relatively infrequently (e.g., centered around 09:40 AM on Monday mornings), or may encompass a larger time window that occurs more frequently (e.g., before noon on weekdays), or with some other combination of duration and frequency.

Note that a specific time period can exist in multiple seasonalities. For example, 09:40 AM on a Monday morning could be part of the previously mentioned very small time window that occurs around 09:40 AM on Monday mornings, as well as the seasonality encompassing before noon on weekdays, and even a seasonality for holidays if the particular Monday is a holiday. Overlapping seasonalities can be handled a number of different ways, including assigning priorities to particular seasonalities based on a number of factors such as frequency and specificity. Specifically, a seasonality for a holiday might take precedent over a seasonality for weekday mornings because the holiday is a relatively rare event and user behavior is likely to be different on a holiday. Furthermore, a seasonality with more specific attributes may take precedent over a more general seasonality. Additionally, which seasonality takes precedent for a particular user may be further refined by observing the behavior of the particular user during the seasonality. For example, if a particular user exhibits little or no change in behavior on a holiday, then the holiday seasonality may not take precedent for the user on future holidays.

As described previously, a seasonality may also be based on or specific to the device that user 110 is using. Therefore, the current seasonality may be different if the request is received from a tablet or from a mobile phone.

Next, the system obtains a reading speed of user 110 and the reading habits of user 110 for the current seasonality (operation 306). This information may be obtained from a profile of the user within the application or service the user employs to access the content feed.

The system also identifies a subset of content items in a content store for inclusion in the requested content feed (operation 308). For example, if the reading habits from the current seasonality indicate that user 110 prefers to read short technology headlines, the system may include only (or primarily) technology related content items in the subset.

The system then estimates a reading session length for user 110 from the reading habits for user 110 for the current seasonality (operation 310). For example, the reading habits for user 110 may indicate that the user only accesses the content feed for an average of five minutes during the current seasonality. Next, the system determines a complexity, with regard to user 110, for each content item in the subset of content items (operation 312), and creates the content feed by ordering the subset of content items according to the reading session length and the complexity of each content item in the subset of content items (operation 314).

Note that determining the complexity is described in more detail below. Finally, the system delivers the content feed to user 110 (operation 316).

Determining Content Complexity

Figure 4:
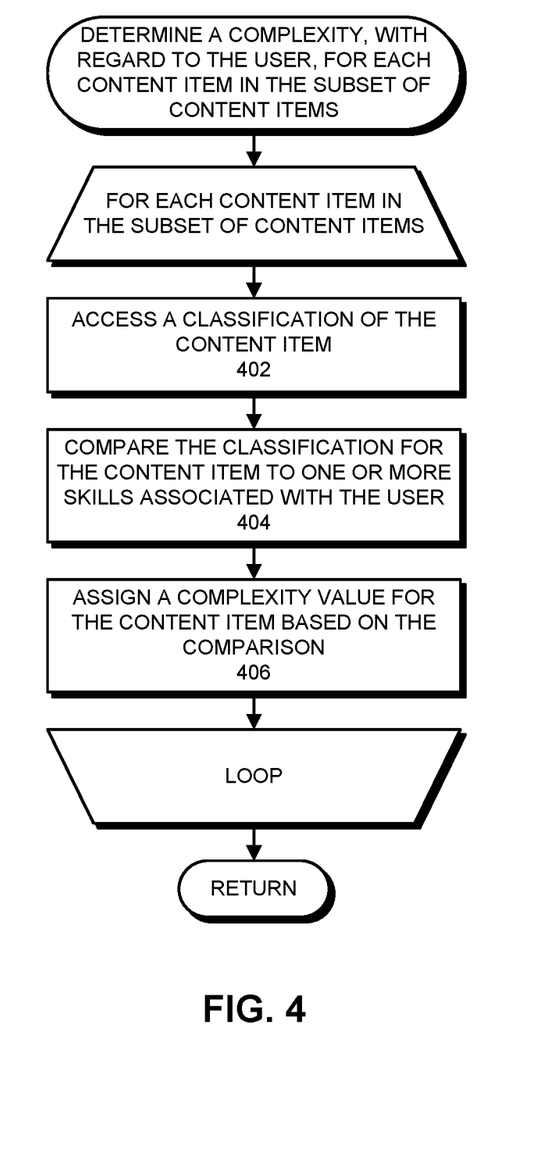
FIG. 4 shows a flowchart illustrating a process of determining content complexity in accordance with the disclosed embodiments.

FIG. 4 shows a flowchart illustrating a process of determining content complexity in accordance with the disclosed embodiments.

During operation, for each content item in a subset of content items to be delivered to a user as part of a content feed, the system performs the following operations: First, the system accesses a classification of the content item (operation 402). For example, the system may analyze tags or metadata associated with the content items, or may receive the classifications from the content source, such as data sources 150 of FIG. 1. Note that any technique(s) for receiving a classification of the content may be used with embodiments herein.

Next, the system compares the classification for the content item to one or more skills associated with user 110 (operation 404). These skills may be available from a profile of the user within the application or service that provides the content feed. Finally, based on the comparison, the system assigns a complexity value for the content item (operation 406). Note that this complexity value is user-specific. For example, if user 110 is a computer programmer, the system might assign a lower complexity value to content items associated with computer programming than the system typically would for a user that is not a computer programmer. Thus, the complexity of a content item is user-specific and is based on the reading statistics of the user and known skills of the user. In some embodiments, user 110 may be able to review skills, complexities, and reading speed, and may subsequently alter or override these values.

Ordering the Content

Figure 5:
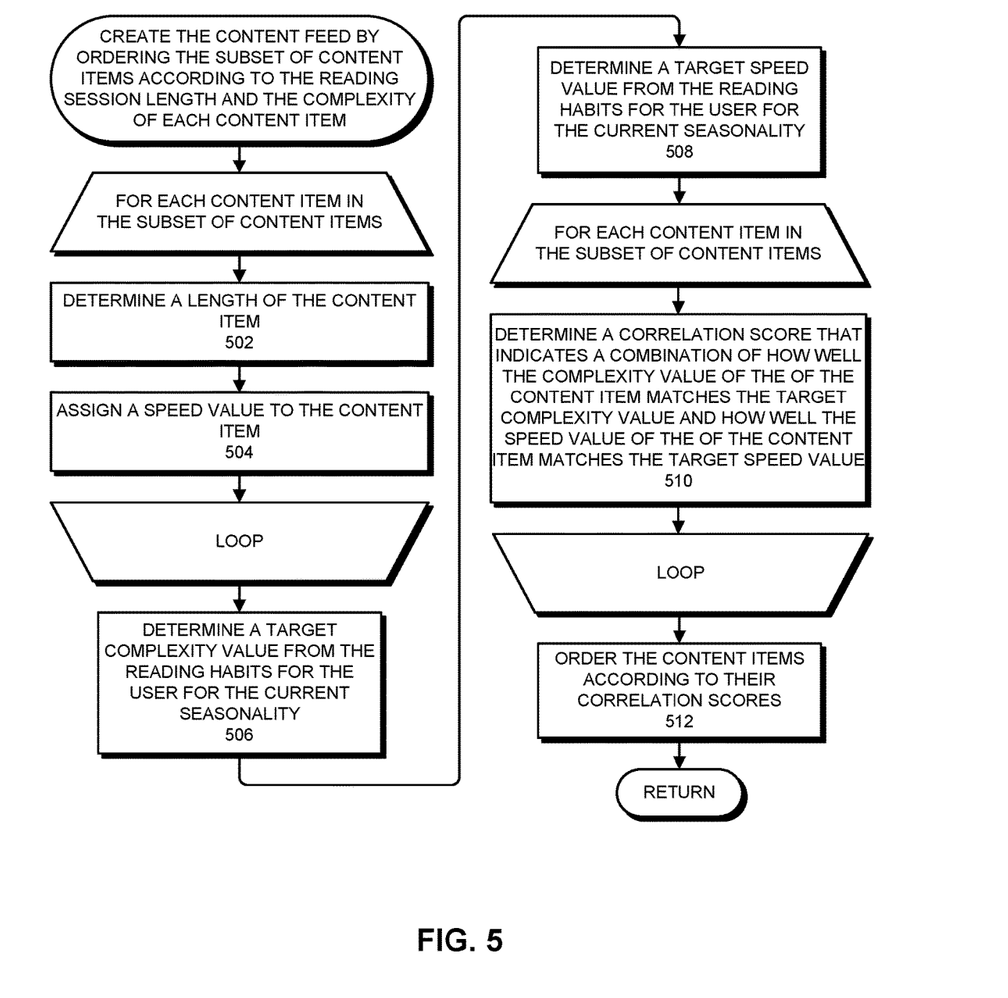
FIG. 5 shows a flowchart illustrating a process of ordering the subset of content items in accordance with the disclosed embodiments.

FIG. 5 shows a flowchart illustrating a process of ordering the subset of content items in accordance with the disclosed embodiments.

During operation, for each content item in a subset of content items to be delivered to a user as part of a content feed, the system performs the following operations: First, the system determines a length of the content item (operation 502). Note that this can be accomplished a number of different ways, including a simple character count or word count of the content item. Alternatively, the system may rely on metadata associated with the content item that indicates the length of the content item.

Next, the system assigns a consumption time to the content item according to the reading speed of user 110 and the complexity value for the content item (operation 504). For example, if the complexity score indicates that the content item is relatively complex for user 110, the system may increase the consumption time for the content item to indicate that it will take longer for user 110 to read. Likewise, if the content item is of low complexity, the consumption time may be adjusted downward accordingly.

Finally, the system orders the content items according to how the consumption times of the content items and the complexity values of the content items match the reading habits for user 110 for the current seasonality. In some embodiments, this ordering is carried out by ranking service 160 and content selector 140 of system 105 of FIG. 1. This is accomplished by first determining a threshold complexity value from the reading habits for user 110 for the current seasonality (operation 506). The threshold complexity value may be determined a number of different ways, including determining an average complexity value, or a median complexity value, of content items associated with the current seasonality from the reading habits for user 110.

Next, the system determines a threshold consumption time from the reading habits for user 110 for the current seasonality (operation 508). Like the threshold complexity value, the threshold seed value may be determined a number of different ways, including determining an average consumption time, or a median consumption time, of content items associated with the current seasonality from the reading habits for user 110.

For each content item in the subset of content items, the system then determines a correlation score that indicates a combination of how well the complexity value of the content item matches the threshold complexity value and how well the consumption time of the of the content item matches the threshold consumption time (operation 510). Note that this correlation score can be weighted in various manners, including a preference toward complexity or a preference toward speed. In addition, the correlation score can also take into consideration minimum and maximum thresholds for speed and complexity. The technique used for the calculation of the correlation score may vary from one embodiment to the next.

Finally, the system orders the content items according to their correlation scores (operation 512). Note that some items of content, such as sponsored content, may appear in fixed positions within the order, or at artificially boosted or lowered positions within the order.

Defining Seasonalities

Figure 6:
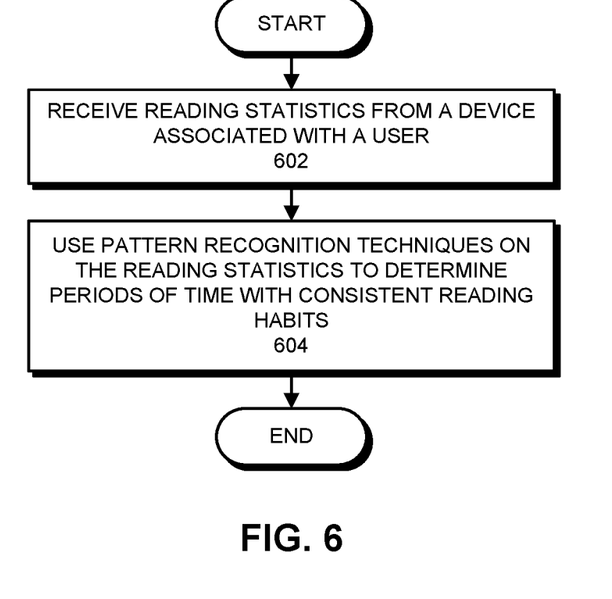
FIG. 6 shows a flowchart illustrating a process of defining seasonalities in accordance with the disclosed embodiments.

FIG. 6 shows a flowchart illustrating a process of defining seasonalities in accordance with the disclosed embodiments.

During operation, the system receives reading statistics from a device associated with user 110 (operation 602). For example, as user 110 interacts with content from the content feed on a device from devices 120, the device sends tracking information to tracking server 170, which in turn stores the statistics in tracking data store 180. The system then uses pattern recognition techniques on the reading statistics to determine periods of time wherein user 110 exhibits consistent reading habits (operation 604). Note that many different pattern recognition techniques exist and can be used with embodiments to determine the seasonalities. Additionally, these pattern recognition techniques and related machine learning models, such as supervised learning, classification, regression, dimensionality reduction, structured prediction, reinforcement learning, etc., can continually be trained and refined with observed results to increase the accuracy of subsequent recognition operations. These pattern recognition techniques look for periods of time in which user 110's reading habits are similar and consistent.

For example, the pattern recognition technique may discover a period of time where user 110 consistently accesses content items that are relatively short and relatively less complex, and reads for only a few minutes, and another period of time wherein user 110 consistently accesses content items that are relatively longer and relatively more complex, and reads for thirty minutes or more. Note that the thresholds in use with the pattern recognition techniques for determining seasonalities may vary from one implementation to the next, or may be tuned by an administrator or provider.

Seasonalities can be very short periods of time, or may be very long periods of time, as long as the reading habits of the user are consistent within the seasonality. Examples of seasonalities can include a time of day, a day of the week, a day of the month, a month of the year, a season of the year, a specified holiday, or some other predetermined time interval. In many instances, the seasonality for a specific user may be associated with other activities of the user, such as commute times, work schedules, worship schedules, vacations, etc. In some embodiments, user 110 may manually define a seasonality.

The reading statistics may also be used to calculate (or estimate) a reading speed of the user. For example, based on the number and composition of content items the user consumed during a given period of time, the user's reading speed may be calculated as a number of words, lines, paragraphs, or other textual entities per unit of time. Different reading speeds may be measured for different devices, different seasonalities, different content types/sources, etc. The reading speed of the user is used in conjunction with content complexities to determine consumption times for the content items.

Figure 7:
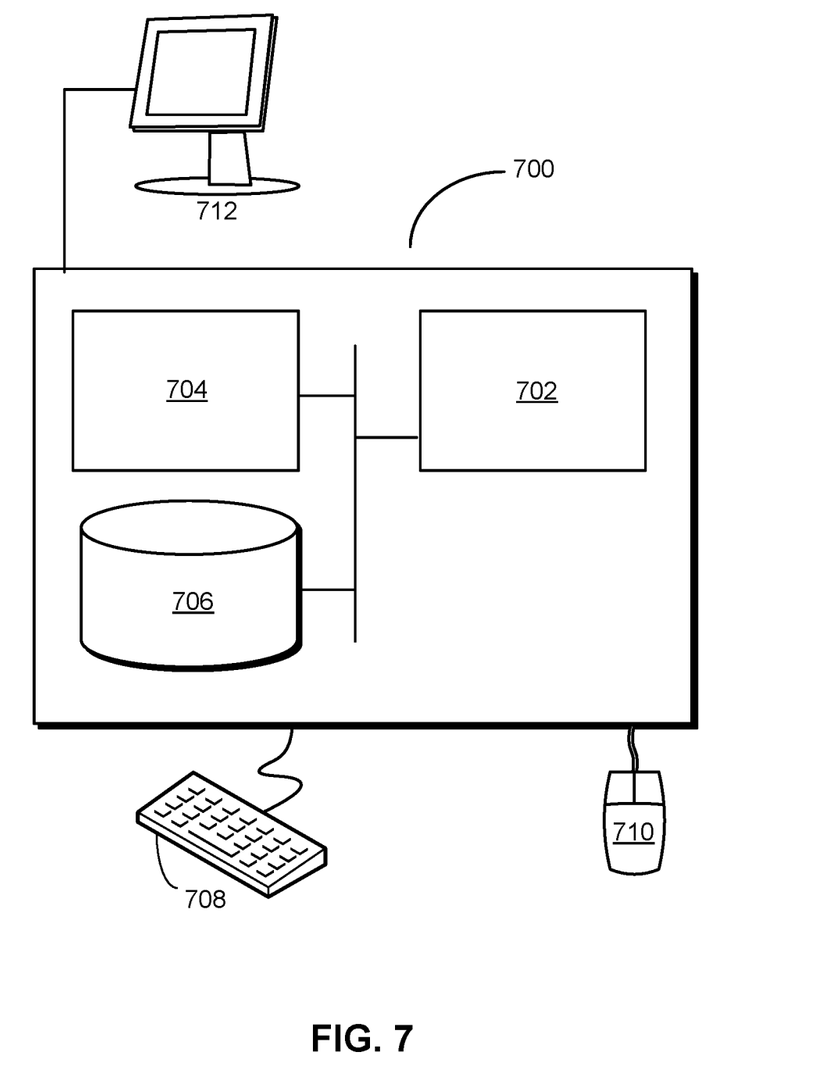
FIG. 7 shows a computer system in accordance with the disclosed embodiments.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for ordering content. Note that one or more components of computer system 700 may be remotely located and connected to the other components over a network. Portions of the present embodiments may also be located on different nodes of a distributed system that implements the embodiments. For example, the present embodiments may be implemented using a cloud computing system that tracks user behaviors when accessing content, and uses the gathered tracking data to maximize the propensity of content consumption according to content complexity and content consumption time.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
  receiving a request from a user using a user device to access a content feed;
  based on a time of receipt of the request and the user device, identifying a current seasonality, wherein the current seasonality corresponds to reading habits of the user during a time period encompassing the time of receipt;
  accessing a profile for the user to obtain a reading speed of the user and the reading habits of the user for the current seasonality;

identifying a subset of content items in a content store for inclusion in the requested content feed;

estimating a reading session length for the user from the reading habits for the user for the current seasonality;

determining, using a computer, a complexity, with regard to the user, for each content item in the subset of content items, wherein the complexity of each content item is determined based on comparing a classification of the content item to known skills of the user from the profile for the user;

creating the content feed by ordering the subset of content items according to the reading session length and the complexity of each content item in the subset of content items; and delivering the content feed to the user by displaying the content feed on the user device based on the determined order, wherein the order of the displayed content feed is partially determined based on the user device.

2. The method of claim 1, wherein determining the complexity for each content item in the subset of content items with regard to the user involves, for each content item in the subset of content items:

accessing the classification of the content item;

comparing the classification for the content item to one or more skills associated with the user; and based on the comparison, assigning a complexity value for the content item.

3. The method of claim 2, wherein ordering the subset of content items involves:

for each content item in the subset of content items:
determining a length of the content item; and
assigning a consumption time to the content item according to the reading speed of the user and the complexity value for the content item; and ordering the content items according to how the consumption times of the content items and the complexity values of the content items match the reading habits for the user for the current seasonality.

4. The method of claim 3, wherein ordering the content items according to how the consumption times of the content items and the complexity values of the content items match the reading habits for the user for the current seasonality involves:

determining a threshold complexity value from the reading habits for the user for the current seasonality;

determining a threshold consumption time from the reading habits for the user for the current seasonality; and for each content item in the subset of content items:
determining a correlation score that indicates a combination of how well the complexity value of the of the content item matches the threshold complexity value and how well the consumption time of the of the content item matches the threshold consumption time; and ordering the content item in the subset of content items according to the correlation score.

5. The method of claim 1, wherein the seasonalities are device dependent.

6. The method of claim 1, further comprising defining one or more seasonalities for the user by:

receiving reading statistics from a device associated with the user; and using pattern-recognition techniques on the reading statistics to determine periods of time wherein the reading habits of the user are similar.

7. The method of claim 1, wherein the current seasonality includes at least one of:

a time of day;
a day of the week;
a day of the month;
a month of the year;
a season of the year;
a specified holiday; and
a predetermined time interval.

8. The method of claim 1, wherein ordering the subset of content items for the user involves:

determining that a first content item is a sponsored item of content; and placing the first content item in a predetermined position in the order.

9. An apparatus, comprising:

one or more processors; and memory storing instructions that, when executed by the one or more processors, cause the apparatus to:

receive a request from a user using a user device to access a content feed;

based on a time of receipt of the request and the user device, identify a current seasonality, wherein the current seasonality corresponds to reading habits of the user during a time period encompassing the time of receipt;

access a profile for the user to obtain a reading speed of the user and the reading habits of the user for the current seasonality;

identify a subset of content items in a content store for inclusion in the requested content feed;

estimate a reading session length for the user from the reading habits for the user for the current seasonality;

determine a complexity, with regard to the user, for each content item in the subset of content items, wherein the complexity of each content item is determined based on comparing a classification of the content item to known skills of the user from the profile for the user;

create the content feed by ordering the subset of content items according to the reading session length and the complexity of each content item in the subset of content items; and deliver the content feed to the user by displaying the content feed on the user device based on the determined order, wherein the order of the displayed content feed is partially determined based on the user device.

10. The apparatus of claim 9, wherein determining the complexity for each content item in the subset of content items with regard to the user involves, for each content item in the subset of content items:

accessing the classification of the content item;

comparing the classification for the content item to one or more skills associated with the user; and based on the comparison, assigning a complexity value for the content item.

11. The apparatus of claim 10, wherein ordering the subset of content items involves:

for each content item in the subset of content items:
determining a length of the content item; and
assigning a consumption time to the content item according to the reading speed of the user and the complexity value for the content item; and ordering the content items according to how the consumption times of the content items and the complexity values of the content items match the reading habits for the user for the current seasonality.

12. The apparatus of claim 11, wherein ordering the content items according to how the consumption times of the content items and the complexity values of the content items match the reading habits for the user for the current seasonality involves:
   determining a threshold complexity value from the reading habits for the user for the current seasonality;
   determining a threshold consumption time from the reading habits for the user for the current seasonality; and
   for each content item in the subset of content items:
      determining a correlation score that indicates a combination of how well the complexity value of the of the content item matches the threshold complexity value and how well the consumption time of the of the content item matches the threshold consumption time; and
      ordering the content item in the subset of content items according to the correlation score.

13. The apparatus of claim 9, wherein the seasonalities are device dependent.

14. The apparatus of claim 9, further comprising defining one or more seasonalities for the user by:
   receiving reading statistics from a device associated with the user; and
   using pattern-recognition techniques on the reading statistics to determine periods of time wherein the reading habits of the user are similar.

15. The apparatus of claim 9, wherein the current seasonality includes at least one of:
   a time of day;
   a day of the week;
   a day of the month;
   a month of the year;
   a season of the year;
   a specified holiday; and
   a predetermined time interval.

16. The apparatus of claim 9, wherein ordering the subset of content items for the user involves:
   determining that a first content item is a sponsored item of content; and
   placing the first content item in a predetermined position in the order.

17. A system, comprising:
   one or more processors;
   a receiving mechanism comprising a non-transitory computer-readable medium comprising instructions that, when executed by the one or more processors, cause the system to receive a request from a user using a user device to access a content feed;
   an identification mechanism comprising a non-transitory computer-readable medium comprising instructions that, when executed by the one or more processors, cause the system to identify a current seasonality based on a time of receipt of the request and the user device, wherein:
      the current seasonality corresponds to reading habits of the user during a time period encompassing the time of receipt;
      the receiving mechanism is further configured to access a profile for the user to obtain a reading speed of the user and the reading habits of the user for the current seasonality; and
      the identification mechanism is further configured to identify a subset of content items in a content store for inclusion in the requested content feed;
   a determination mechanism comprising a non-transitory computer-readable medium comprising instructions that, when executed by the one or more processors, cause the system to:
      estimate a reading session length for the user from the reading habits for the user for the current seasonality; and
      determine a complexity, with regard to the user, for each content item in the subset of content items, wherein the complexity of each content item is determined based on comparing a classification of the content item to known skills of the user from the profile for the user;
   a feed mechanism comprising a non-transitory computer-readable medium comprising instructions that, when executed by the one or more processors, cause the system to create the content feed by ordering the subset of content items according to the reading session length and the complexity of each content item in the subset of content items; and
   a delivery mechanism comprising a non-transitory computer-readable medium comprising instructions that, when executed by the one or more processors, cause the system to deliver the content feed to the user by displaying the content feed on the user device based on the determined order, wherein the order of the displayed content feed is partially determined based on the user device.

18. The system of claim 17, wherein the non-transitory computer-readable medium of the determination mechanism further comprises instructions that, when executed by the one or more processors, cause the system to determine the complexity for each content item in the subset of content items with regard to the user by, for each content item in the subset of content items:
   accessing the classification of the content item;
   comparing the classification for the content item to one or more skills associated with the user; and
   based on the comparison, assigning a complexity value for the content item.

19. The system of claim 18, wherein the feed mechanism is configured to order the subset of content items by:
   for each content item in the subset of content items:
      determining a length of the content item; and
      assigning a consumption time to the content item according to the reading speed of the user and the complexity value for the content item; and
   ordering the content items according to how the consumption times of the content items and the complexity values of the content items match the reading habits for the user for the current seasonality.

20. The system of claim 19, wherein ordering the content items according to how the consumption times of the content items and the complexity values of the content items match the reading habits for the user for the current seasonality involves the feed mechanism:
   determining a threshold complexity value from the reading habits for the user for the current seasonality;
   determining a threshold consumption time from the reading habits for the user for the current seasonality; and
   for each content item in the subset of content items:
      determining a correlation score that indicates a combination of how well the complexity value of the of the content item matches the threshold complexity value and how well the consumption time of the of the content item matches the threshold consumption time; and ordering the content item in the subset of content items according to the correlation score.

* * * * *